United States Patent
Oh et al.

(10) Patent No.: US 10,040,198 B2
(45) Date of Patent: Aug. 7, 2018

(54) METHOD OF PROCESSING LOCATION INFORMATION AND METHOD OF PROCESSING MEASUREMENT INFORMATION INCLUDING THE SAME

(71) Applicant: SAMSUNG ELECTRONICS CO., LTD., Suwon-si, Gyeonggi-do (KR)

(72) Inventors: Kyoung-Whan Oh, Suwon-si (KR); Sung-Chul Go, Hwaseong-si (KR); Eun-Kyung Hong, Seoul (KR); Dong-Hyun Kim, Hwaseong-si (KR); Jin-Ha Choi, Yongin-si (KR)

(73) Assignee: SAMSUNG ELETCRONICS CO., LTD., Suwon-si, Gyeonggi-do (KR)

( * ) Notice: Subject to any disclaimer, the term of this patent is extended or adjusted under 35 U.S.C. 154(b) by 176 days.

(21) Appl. No.: 14/876,612

(22) Filed: Oct. 6, 2015

(65) Prior Publication Data

US 2016/0189992 A1 Jun. 30, 2016

(30) Foreign Application Priority Data

Dec. 26, 2014 (KR) ........................ 10-2014-0191128

(51) Int. Cl.
| | | |
|---|---|---|
| H01L 21/67 | (2006.01) |
| B25J 9/02 | (2006.01) |
| B25J 9/16 | (2006.01) |
| G01C 21/20 | (2006.01) |

(52) U.S. Cl.
CPC ... *B25J 9/1694* (2013.01); *G05B 2219/34099* (2013.01); *Y10S 901/02* (2013.01); *Y10S 901/46* (2013.01)

(58) Field of Classification Search
CPC .......... B25J 9/1694; G05B 2219/34099; Y10S 901/02; Y10S 901/46; G01C 21/20; H01L 21/67259
See application file for complete search history.

(56) References Cited

U.S. PATENT DOCUMENTS

| | | | |
|---|---|---|---|
| 6,975,406 B2 | 12/2005 | Demarest | |
| 8,630,382 B2 | 1/2014 | Oakley et al. | |
| 9,606,848 B2 * | 3/2017 | Wellman | ............. G06F 11/0706 |
| 2007/0239347 A1 * | 10/2007 | Watanabe | .............. G01C 21/28 |
| | | | 701/469 |

(Continued)

FOREIGN PATENT DOCUMENTS

| | | |
|---|---|---|
| JP | 08313278 A * | 11/1996 |
| JP | 10-249766 | 9/1998 |

(Continued)

*Primary Examiner* — Khoi H Tran
*Assistant Examiner* — Robert T Nguyen
(74) *Attorney, Agent, or Firm* — F. Chau & Associates, LLC

(57) ABSTRACT

A method of processing measurement information in which a determined parameter value is determined at each of a plurality of measurement times including determining a predicted parameter value at each of the measurement times, determining an error range at each of the measurement times based on the predicted parameter value, obtaining a measured parameter value at each of the measurement times, and determining the determined parameter value based on the predicted parameter value, the measured parameter value, and the error range.

14 Claims, 12 Drawing Sheets

(56) References Cited

U.S. PATENT DOCUMENTS

2009/0154791 A1  6/2009  Yoon et al.
2013/0103192 A1  4/2013  Huettenhofer
2014/0052296 A1  2/2014  Lee et al.
2014/0244094 A1  8/2014  Kim et al.

FOREIGN PATENT DOCUMENTS

| JP | 2005-125478 | 5/2005 |
| JP | 2011-002880 | 1/2011 |
| JP | 2014-131825 | 7/2014 |
| KR | 1020080094618 | 10/2008 |
| KR | 1020090070408 | 7/2009 |
| KR | 1020110006064 | 1/2011 |
| KR | 1020130108678 | 10/2013 |
| KR | 1020140112824 | 9/2014 |

\* cited by examiner

US 10,040,198 B2

METHOD OF PROCESSING LOCATION INFORMATION AND METHOD OF PROCESSING MEASUREMENT INFORMATION INCLUDING THE SAME

CROSS-REFERENCE TO RELATED APPLICATION

This application claims the benefit of Korean Patent Application No. 10-2014-0191128, filed on Dec. 26, 2014, in the Korean Intellectual Property Office, the disclosure of which is incorporated by reference, in its entirety.

TECHNICAL FIELD

The inventive concept relates to processing measurement information, and more particularly, to a method of processing location information and a method of processing measurement information including the same.

DISCUSSION OF RELATED ART

The manufacture of semiconductor devices is a difficult process requiring a high degree of accuracy. An error in location information is a great problem associated with controlling a robot. The location information is greatly affected by noise or the like.

The ability to accurately perform a measurement in a semiconductor device during manufacture is highly desirable. It is also desirable, to accurately perform a measurement of robotic equipment used during semiconductor manufacturing. However, it is not always possible to perform a measurement at the time a decision is required.

SUMMARY

The inventive concept provides a method of processing location information that may reliably determine whether or not a measured value is erroneous and then correct the error even where the measurement includes various types of noise and a method of processing measurement information including the same.

According to an embodiment of the invention, a method is provided of processing location information including determining a predicted location value at a first measurement time. The determining of an error range is based on the predicted location value. The obtaining of a measured location value at the first measurement time. The determining of a determined location value at the first measurement time is based on the predicted location value, the measured location value, and the error range.

In some embodiments, in the determining of the determined location value, when the measured location value is out of the error range, the measured location value is identified as noise and thus the predicted location value is determined as the determined location value. When the measured location value is within the error range, the measured location value is determined as the determined location value.

In some embodiments, the determining of the predicted location value includes determining the predicted location value at the first measurement time by using an extrapolation method.

In some embodiments, The predicted location value is determined at the first measurement time by using a change in the location value at a second measurement time immediately prior to the first measurement time.

In some embodiments, The predicted location value at the first measurement time is determined using an average of changes in the location value that occur at each of a plurality of successive measurement times immediately prior to the first measurement time.

In some embodiments, determining the predicted location value at the first measurement time using a weighted average of changes in the location value that occur at each of a plurality of successive measurement times immediately prior to the first measurement time.

In some embodiments, determining the predicted location value at the first measurement time includes scaling a change in the location value commanded at a command time of a second measurement time immediately prior to the first measurement time.

In some embodiments, determining the predicted location value at the first measurement time includes scaling a change in the location value commanded at a command time that is selected from a plurality of measurement times prior to the second measurement time which is immediately prior to the first measurement time and closest to the second measurement time.

In some embodiments, determining the predicted location value at the first measurement time includes using a change in the location value between a second measurement time immediately prior to the first measurement time and the first measurement time. The second measurement time is learned by repeatedly performing certain operations and is stored in a database.

According to embodiment of the invention, a method is provided for processing measurement information that includes determining a predicted parameter value at a first measurement time. An error range is determined based on the predicted parameter value. A measured parameter value is obtained at the first measurement time. A determined parameter value is determined based on the predicted parameter value, the measured parameter value, and the error range.

In some embodiments, the measured parameter value is a measurement value measured in a semiconductor device when manufacturing the semiconductor device.

In some embodiments, the measured parameter value is a measurement value measured in manufacturing equipment used for manufacturing a semiconductor device.

In some embodiments, the measured parameter value is selected from one of a location, temperature, impedance, admittance, current, voltage, thickness of the semiconductor device and thickness of the manufacturing equipment for a semiconductor device.

In some embodiments, in the determining of the determined parameter value, when the measured parameter value is within the error range, the measured parameter value is determined to be the determined parameter value at the measurement time.

In some embodiments, in the determining of the determined parameter value, when the measured parameter value is out of the error range, the predicted parameter value is determined to be the determined parameter value at the measurement time.

According to an embodiment of the invention, a method is provided for processing measurement information, in which a determined parameter value is determined at each of measurement times, that includes determining a predicted parameter value at each of the measurement times. An error range is determined at each of the measurement times based on the predicted parameter value. A measured parameter value is obtained at each of the measurement times, and the determined parameter value is determined based on the predicted parameter value, the measured parameter value, and the error range.

In some embodiments, the error ranges at the measurement times have identical widths.

According to an embodiment of the invention, a method is provided for predicting a predicted parameter value at least at a first measurement time. An error range is calculated, wherein the error range has a top which is greater than and a bottom which is less than the predicted parameter value. A measured parameter value is measured at a second measurement time, wherein the second measurement time occurs after the first measurement time. The measured parameter value is accepted as a determined parameter value when the measured parameter value falls within the error range or the measured parameter value is rejected when the measured parameter value falls outside the error range.

In some embodiments, determining the error range includes taking into account a physical limit of a change of an object between a first measurement time and a second measurement time, such as a moving speed, a maximum range of acceleration and deceleration of an object.

In some embodiments, controlling the movement of a robot is based on a command parameter value; wherein the predicted parameter value is based on a change in the command parameter value.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1A:
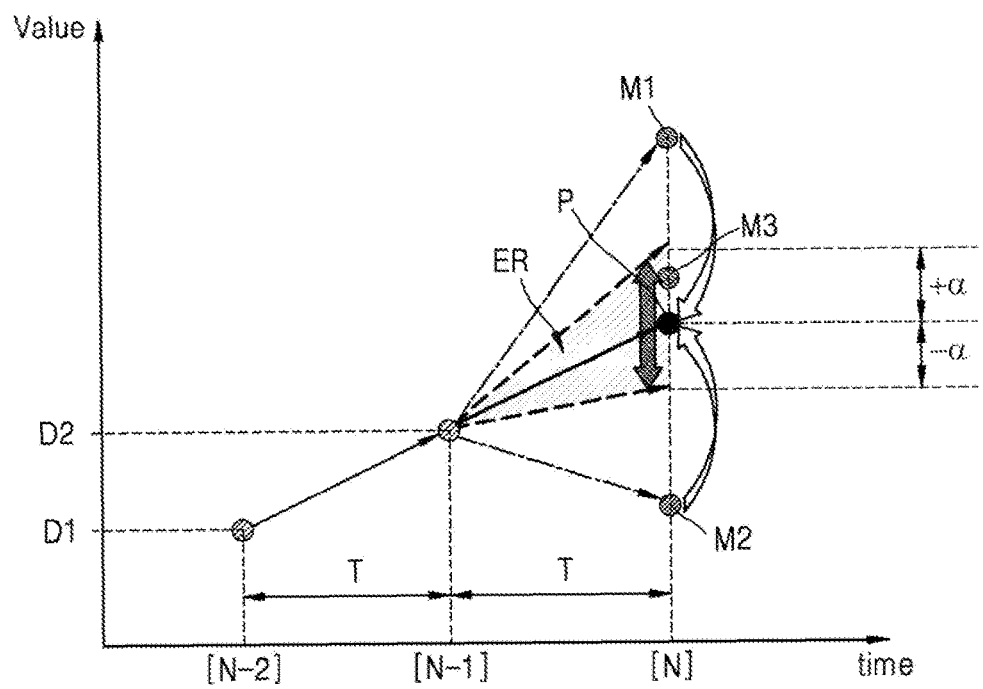
FIGS. 1A and 1B are a conceptual view and a flowchart of a method for processing measurement information according to one or more exemplary embodiments.

The inventive concept will now be described more fully with reference to the accompanying drawings, in which exemplary embodiments of the inventive concept are shown. Similar reference numerals in the drawings denote similar elements, and thus their descriptions will be omitted.

The inventive concept may, however, be embodied in many different forms and should not be construed as limited to the exemplary embodiments set forth herein. Rather, these embodiments are provided for illustrative purposes and will fully convey the scope of the inventive concept to one of ordinary skill in the art.

It will be understood that, although the terms first, second, third etc. may be used herein to describe various elements, these elements should not be limited by these terms. These terms are only used to distinguish one element from another element. Thus, a first element discussed below could be termed a second element without departing from the teachings of exemplary embodiments.

A specific process order may be changed in another embodiment. For example, two processes which are described as being continuously performed may be simultaneously performed or may be performed in a reverse order.

Figure 1B:
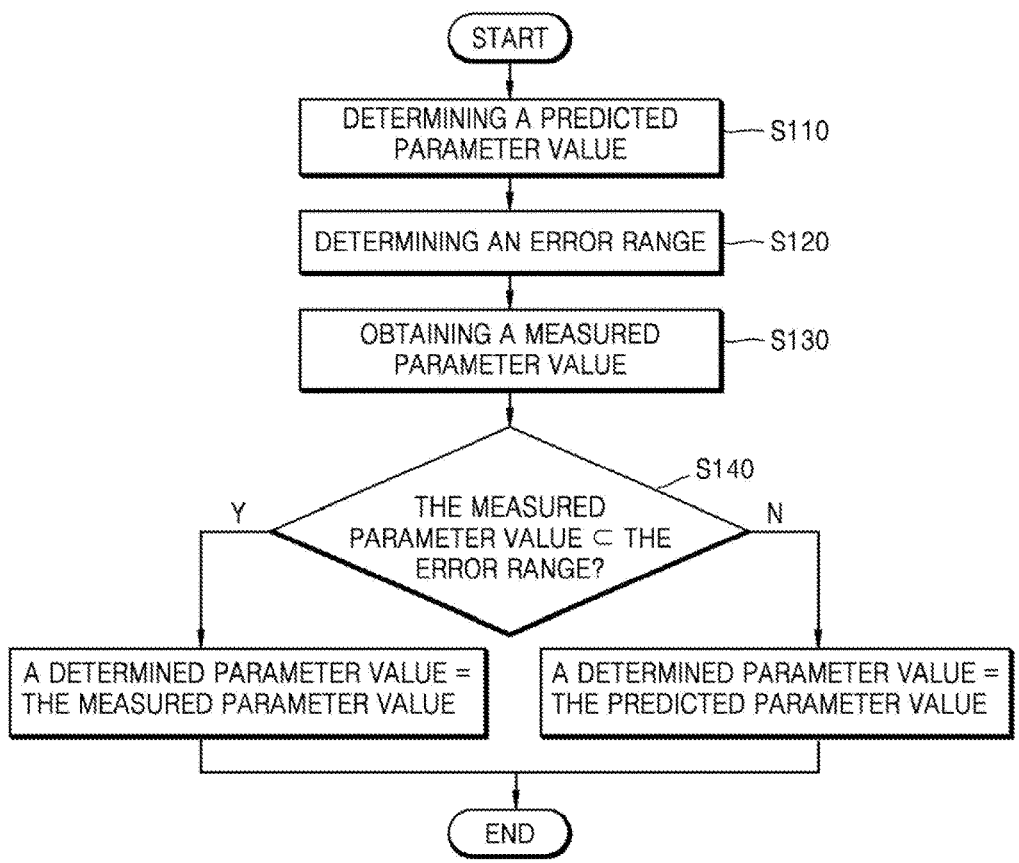

FIGS. 1A and 1B are a concept view and a flowchart of a method of processing measurement information according to one or more exemplary embodiments.

In FIG. 1A, a first axis may denote the time of a manufacturing process for a semiconductor device, and a second axis may denote a certain parameter value.

FIG. 1A shows determined parameter values D1 and D2 determined at measurement times [N−2] and [N−1] during the manufacturing process of a semiconductor device, and a predicted parameter value P at a measurement time [N] after the measurement times [N−2] and [N−1].

The measurement times [N−2], [N−1], and [N] may be repeated at a regular time interval T during the manufacturing process of a semiconductor device. For example, a measurement may be repeatedly performed at regular intervals during the manufacturing process of a semiconductor device.

The measurement times [N−2] and [N−1] are respectively related to determined parameter values D1 and D2. The determined parameter values D1 and D2 are determined using a method of processing measurement information according to one or more exemplary embodiments. Hereinafter, a method for determining a determined parameter value at a measurement time [N] after the determined parameter values D1 and D2 are determined will be described by referring to FIGS. 1A and 1B.

Referring to FIGS. 1A and 1B, a method of processing measurement information may include determining a predicted parameter value P (S110), determining an error range ER (S120), obtaining measured parameter values M1, M2, and M3 (S130), and determining a determined parameter value (S140).

In the determining of the predicted parameter value P (S110), the predicted parameter value P that is expected to be observed at the measurement time [N] may be determined. For example, various methods such as an extrapolation method, a method using an average of changes in the parameter value, a method using a weighted average of changes in the parameter value, a method using a change in a command parameter value, and a method using a learning parameter value may be performed to determine the predicted parameter value P (S110), and each of the various methods will be described with reference to FIGS. 2 to 6B.

In the determining of the error range ER (S120), the error range ER may be determined based on the predicted parameter value P determined above.

The error range ER according to the exemplary embodiment is illustrated to have ±α widths below and above the predicted parameter value P, but is not limited thereto. For example, a parameter value that is greater than the predicted parameter value P falls in the +α width of the error range ER while a parameter less than the predicted parameter value P falls in the −α width thereof.

In some embodiments, the error range ER may be determined by taking into account a physical limit of a change between the measurement time [N−1] and the measurement time [N]. For example, when the parameter value is a position value of a certain object (not shown), position values D1 and D2 at measurement times [N−2], and [N−1] respectively and the regular time interval T may be used to calculate a moving speed of the object. In this case, a maximum acceleration range and a maximum deceleration range may be calculated by taking into account a drive capability of a motor (not shown) that may move the object. Accordingly, the error range ER may be determined by taking into account the moving speed, the maximum range of acceleration and deceleration of the object, and the like.

When obtaining of the measured parameter value (S130), a measured parameter value (any one selected from M1, M2 and M3) may be measured by a measurement apparatus (not shown) to be obtained at the measurement time [N].

In FIG. 1A, a plurality of measured parameter values M1, M2, and M3 are shown to explain the determined parameter values determined based on various measured parameter values, but the measured parameter value at the measurement time [N] may be any one selected from the measured parameter values M1, M2, and M3.

In some embodiments, the measured parameter values M1, M2, and M3 may be various measurement values that may be measured in a semiconductor device during the manufacture of the semiconductor device. For example, the measured parameter values M1, M2, and M3 may be various measurement values representing the temperature, impedance, admittance, current, voltage, thickness, or the like, of a certain portion of the semiconductor device.

In some embodiments, the measured parameter values M1, M2, and M3 may be various measurement values that may be measured in the manufacturing equipment used for manufacturing a semiconductor device. For example, the measured parameter values M1, M2, and M3 may be various measurement values representing the temperature of the manufacturing equipment, current flowing into a certain portion of the manufacturing equipment, or a robot-arm position of the manufacturing equipment.

The measured parameter values M1, M2, and M3, the predicted parameter value P and the determined parameter values D1 and D2 may represent an identical measurement value among the various measurement values described above. For example, when the measured parameter values M1, M2, and M3 represent the position value of the robot arm or the like, the predicted parameter value P and the determined parameter values D1 and D2 may also represent the position value of the robot arm or the like.

In the determining of the determined parameter value (S140), the determined parameter value at the measurement time [N] may be determined by taking into account the measured parameter values M1, M2, and M3 and the predicted parameter value P.

In order to determine the determined parameter value at the measurement time [N], the measured parameter values M1, M2, and M3 obtained in the obtaining of the measured parameter value (S130) may be examined in terms of whether or not the measured parameter values M1, M2, and M3 are within the error range ER.

In detail, when the measured parameter value M1 is obtained in the obtaining of the measured parameter value (S130), the measured parameter value M1 is outside of the error range ER determined based on the predicted parameter value P, and thus the measured parameter value M1 may be determined to be noise. When the measured parameter value M1 is determined to be noise, the predicted parameter value P may be determined to be the determined parameter value at the measurement time [N].

Similarly, when the measured parameter value M2 is obtained in the obtaining of the measured parameter value (S130), the measured parameter value M2 is outside of the error range ER determined with respect to the predicted parameter value P, and thus the predicted parameter value P may be determined to be the determined parameter value at the measurement time [N].

Alternatively, when the measured parameter value, such as the measured parameter value M3, is within the error range ER determined with respect to the predicted parameter value P, the measured parameter value M3 may be determined to be a true measurement value that is different from noise, and then, determined to be the determined parameter value at the measurement time [N].

As described above, when the determined parameter value is determined based on the predicted parameter value, whether or not the measured parameter value is noise may be correctly determined to effectively manage noise. Changes in acceleration or deceleration of the parameter value may be predicted by taking into account the determined parameter values D1 and D2 at the measurement times [N−2] and [N−1] and the predicted parameter value P at the measurement time [N], and thus, the error range ER may be narrowly determined based on the prediction.

In some embodiments, each of the measurement times [N−2], [N−1], [N] is monitored for noise during the manufacturing process of the semiconductor device, whether or not noise is generated. In this case, when the measurement time is monitored for a noise occurrence the noise related to the parameter value may be managed in a quantitative manner or in real time.

FIGS. 2 to 6B are views illustrating various methods of determining the predicted parameter value P. Hereinafter, each of the various methods will be described in detail.

Figure 2:
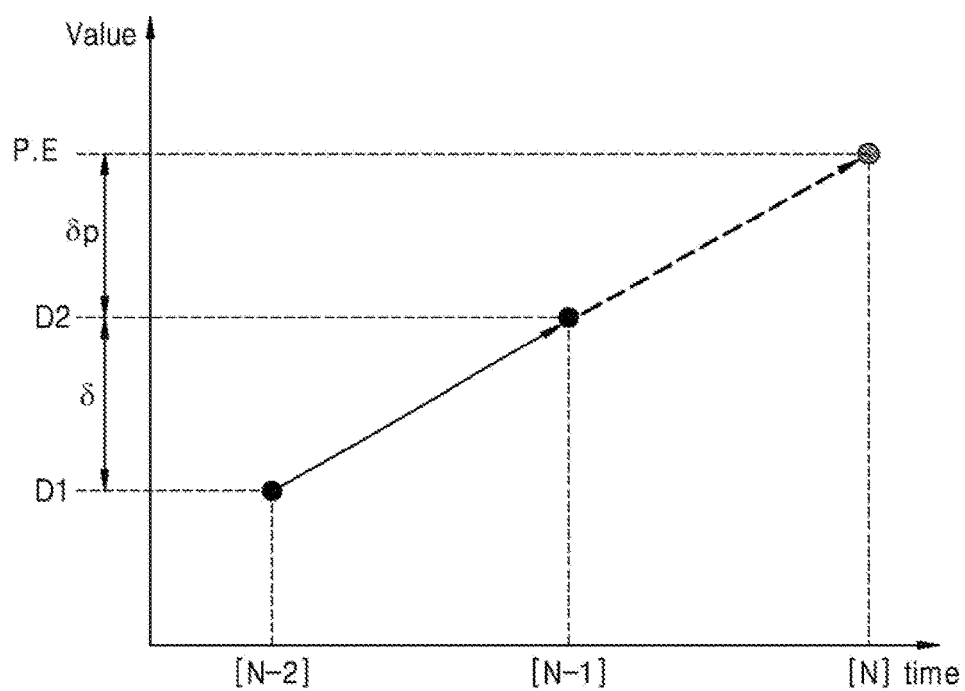
FIG. 2 illustrates a method for determining a predicted parameter value P.E at a measurement time [N] using an extrapolation method.

FIG. 2 illustrates a method of determining a predicted parameter value P.E at a measurement time [N] using an extrapolation method.

In FIG. 2, determined parameter values D1 and D2 at measurement times [N−2], and [N−1], and the predicted parameter value P.E at the measurement time [N] are illustrated.

In some embodiments, the predicted parameter value P.E at the measurement time [N] may be determined using an extrapolation method based on the determined parameter values at the measurement times prior to the measurement time [N]. Here, in the extrapolation method, a trend line may be drawn from the time-series data and extended to predict a parameter value that may come next.

In FIG. 2, as a basic example of an extrapolation method, two determined parameter values D1 and D2 at the measurement times [N−2] and [N−1] prior to the measurement time [N] are used to determine the predicted parameter value P.E.

The relationship between the predicted parameter value P.E and the determined parameter values D1 and D2 in FIG. 2 may be defined by Equation 1 below.

$$P.E = D2 + (D2 - D1) = 2*D2 - D1 \qquad \text{[Equation 1]}$$

Changes in the parameter value δ and δp may respectively represent changes in the parameter value between the measurement times [N−2] and [N−1] and between the measurement times [N−1] and [N].

By substituting the changes in the parameter value δ and δp into Equation 1, Equation 1 may be expressed in Equation 2 that represents the relationship between the changes in the parameter value δ and δp.

$$P.E - D2 = D2 - D1$$

$$\delta p = \delta \quad \text{[Equation 2]}$$

As described above, when the predicted parameter value P.E is determined using an extrapolation method, the predicted parameter value P.E may be easily determined since only the parameter values prior to the predicted parameter are considered.

Figure 3:
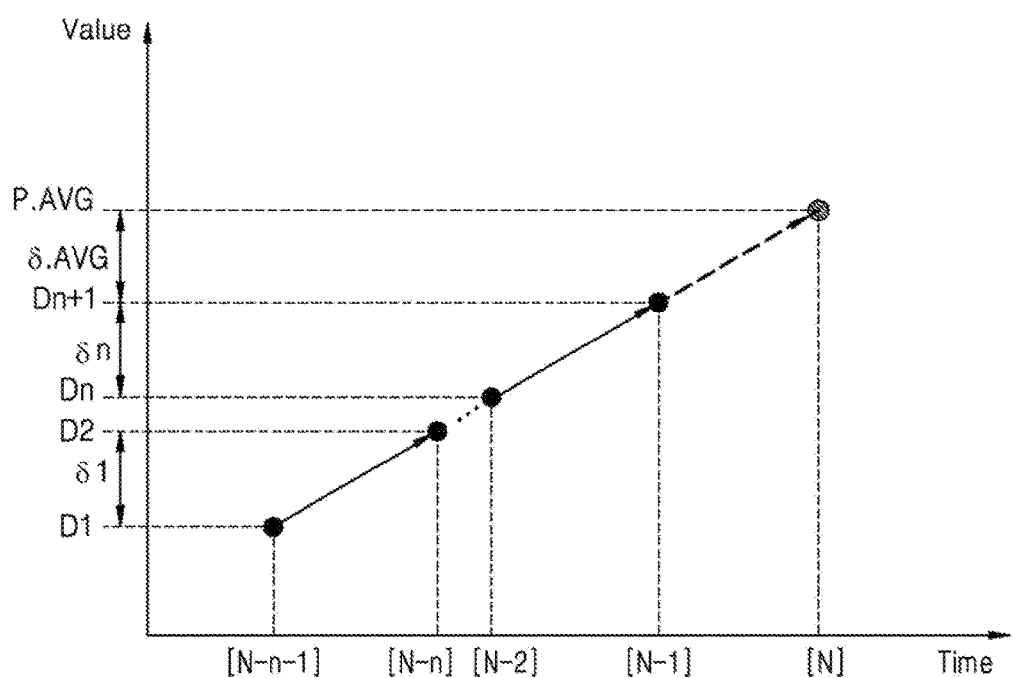
FIG. 3 illustrates a method for determining a predicted parameter value P.AVG at a measurement time [N] using an average of changes in the parameter value δ.AVG.

FIG. 3 illustrates a method of determining a predicted parameter value P.AVG at a measurement time [N] using an average of changes in the parameter value δ.AVG.

In FIG. 3, determined parameter values D1, D2, . . . , Dn, and Dn+1 respectively determined at measurement times [N−n−1], [N−n], [N−2], [N−1] and the predicted parameter value P.AVG at the measurement time [N] are illustrated.

Changes in the parameter value δ1, . . . , and δn may represent changes in a parameter value at each of time intervals between the measurement times [N−n−1], [N−n], [N−2], and [N−1].

The predicted parameter value P.AVG according to the exemplary embodiment may be determined using the average of the changes in the parameter value δ.AVG that is calculated from the changes in the parameter value δ1, . . . , and δn, and a relationship between the predicted parameter value P.AVG and the changes in the parameter value δ1, . . . , and δn may be expressed in Equation 3 below.

$$\delta.AVG = (\delta 1 + \delta 2 + \delta 3 + \ldots + \delta n - 1 + \delta n)/n \quad \text{[Equation 3]}$$

In Equation 3, n may be an integer greater than 0.

When n is 1, Equation 3 may have the same result as described with reference to FIG. 2 using an extrapolation method.

When n is a relatively large number, for example, the number of raw data used for calculating the average of changes in the parameter value δ.AVG becomes large, a relatively stable result may be obtained.

However, when n is a relatively small number, for example, the amount of raw data used for calculating the average of changes in the parameter value δ.AVG becomes small, undermining the stability of the result compared to the aforementioned case, but the changes in the parameter value occurring close to the measurement time [N] may be correctly reflected to predict the parameter value.

When the average of changes in the parameter value δ.AVG is determined from Equation 3, the predicted parameter value P.AVG at the measurement time [N] may be calculated from Equation 4 by using the average of changes in the parameter value δ.AVG.

$$P.AVG = Dn+1 + \delta.AVG \quad \text{[Equation 4]}$$

As described above, when the predicted parameter value P.AVG is determined based on the average of changes in the parameter value δ.AVG, the predicted parameter value P.AVG may be determined in a more stable manner. Otherwise, when the predicted parameter value is determined by only taking into account the parameter change δn occurring right before the measurement time [N], the parameter change δn may include noise, which thereby produces an incorrect predicted parameter value.

Figure 4:
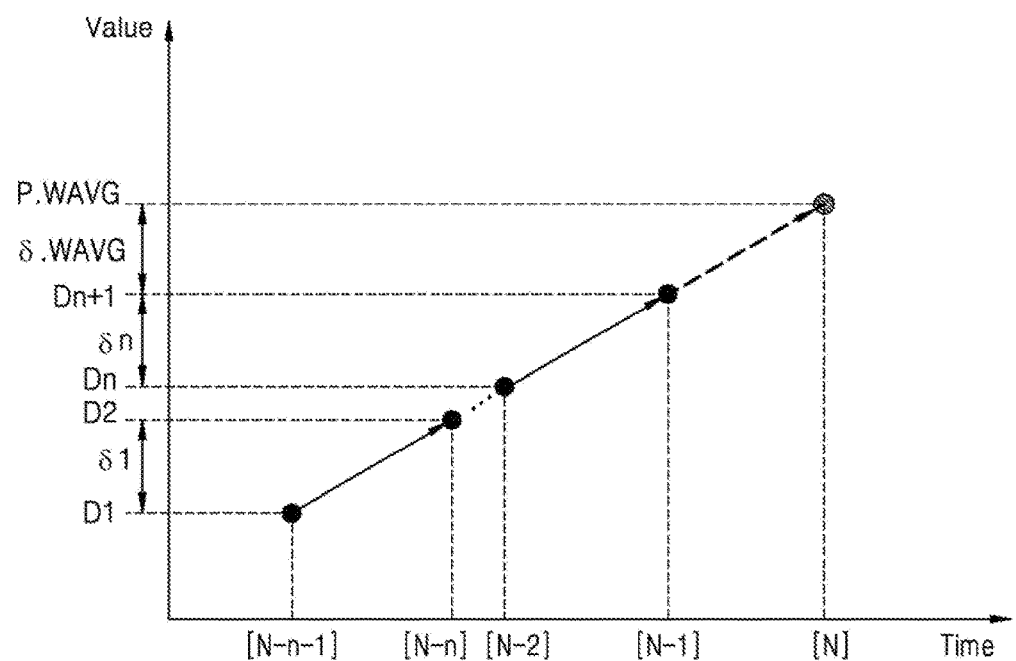
FIG. 4 illustrates a method for determining a predicted parameter value P.WAVG at the measurement time [N] by using a weighted average of the changes in a parameter value δ.WAVG.

FIG. 4 illustrates a method of determining a predicted parameter value P.WAVG at the measurement time [N] by using a weighted average of the changes in the parameter value β.WAVG.

In FIG. 4, determined parameter values D1, D2, . . . , Dn, and Dn+1 that are respectively determined at the measurement times [N−n−1], [N−n], [N−2], and [N−1] and the predicted parameter value P.WAVG at the measurement time [N] are illustrated.

The changes in the parameter value δ1, . . . , and δn may denote changes in parameter values between the measurement times [N−n−1], [N−n], . . . , [N−2], and [N−1].

The predicted parameter value P.WAVG according to the exemplary embodiment may be determined by using the weighted average of changes in the parameter value δ.WAVG calculated based on the changes in the parameter value δ1, . . . , and δn, and a relationship between the predicted parameter value P.WAVG and the changes in the parameter value δ1, . . . , and δn may be expressed in Equation 5 below.

$$\delta.WAVG = (K1*\delta 1 + K2*\delta 2 + K3*\delta 3 + \ldots + Kn-1*\delta n-1 + Kn*\delta n)/n, \quad \text{[Equation 5]}$$

(wherein, $K1+K2+K3++Kn-1+Kn=n$)

In Equation 5, n may be an integer greater than 0, and each of K1, K2, K3, . . . , Kn−1, and Kn may denote a weight for each of the changes in the parameter value δ1, δ2, δ3, . . . , δn−1, and δn.

When n is 1, Equation 5 may have the same result as described with reference to FIG. 2 using an extrapolation method.

When the weights K1, K2, K3, . . . , Kn−1, and Kn are the same number, for example, when K1, K2, K3, . . . , Kn−1, and Kn are 1, Equation 5 may have the same result as described with reference to FIG. 3 using the average of changes in a parameter value.

When the predicted parameter value P.WAVG at the measurement time [N] is determined by using the weights K1, K2, K3, . . . , Kn−1, and Kn, the changes in the parameter value occurring around the measurement time [N] (e.g., δn−1 or δn) may have large weights to emphasize these changes. For example, a relation between the weights K1, K2, K3, . . . , Kn−1, and Kn may be expressed as Equation 6 below.

$$0 < K1 < K2 < K3 < \ldots < Kn-1 < Kn, \quad \text{[Equation 6]}$$

(wherein, $K1+K2+K3++Kn-1+Kn=n$)

When the weights K1, K2, K3, . . . Kn−1, and Kn are expressed in Equation 6, the changes in the parameter value occurring far from the measurement time [N] (e.g., δ1 or δ2) may also be taken into account, but the changes in the parameter value occurring around the measurement time [N] (e.g., δn−1 or δn) may be emphasized more with large weights to determine the predicted parameter value P.WAVG.

The weighted average of changes in the parameter value δ.WAVG may be calculated from Equation 5, and then the predicted parameter value P.WAVG at the measurement time [N] may be calculated from Equation 7 by using the weighted average of changes in the parameter value δ.WAVG.

$$P.WAVG = Dn+1 + \delta.WAVG \quad \text{[Equation 7]}$$

When the predicted parameter value P.WAVG is determined by using the weighted average of changes in the parameter value δ.WAVG, the predicted parameter value P.WAVG may be stably determined, and the changes in the parameter value around the measurement time [N] (e.g., δn−1 or δn) may be emphasized more with large weights to have a more accurate predicted parameter value P.WAVG, similarly to the method using the average of changes in the parameter value δ.AVG.

Figure 5A:
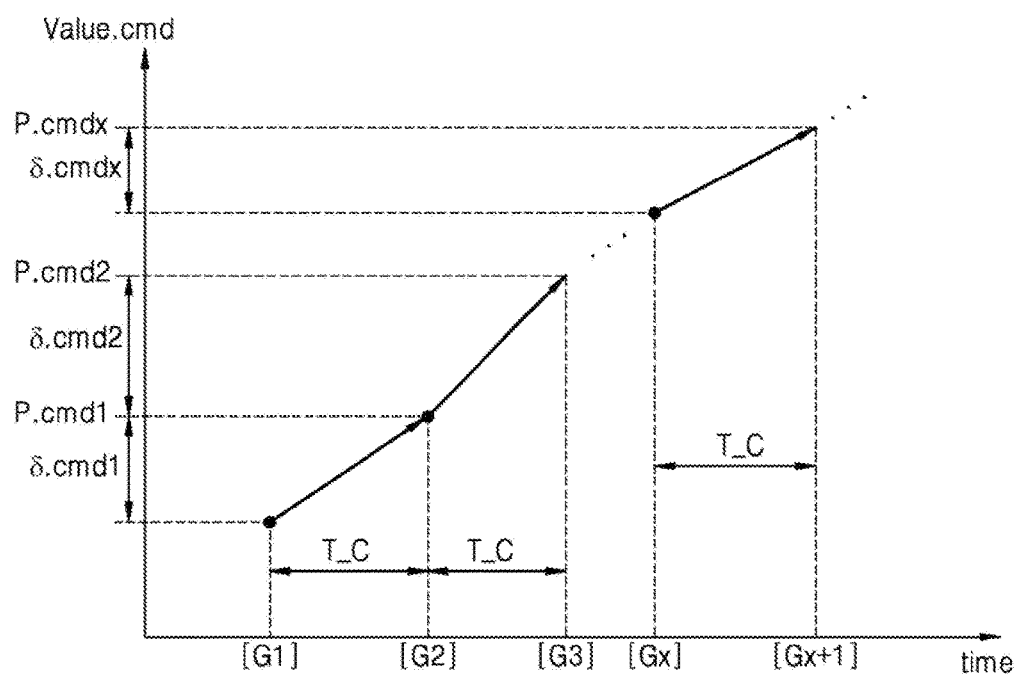
FIGS. 5A and 5B illustrate a method for determining a predicted parameter value P.TP at the measurement time [N] by using changes in a command parameter value δ.cmdx.
Figure 5B:
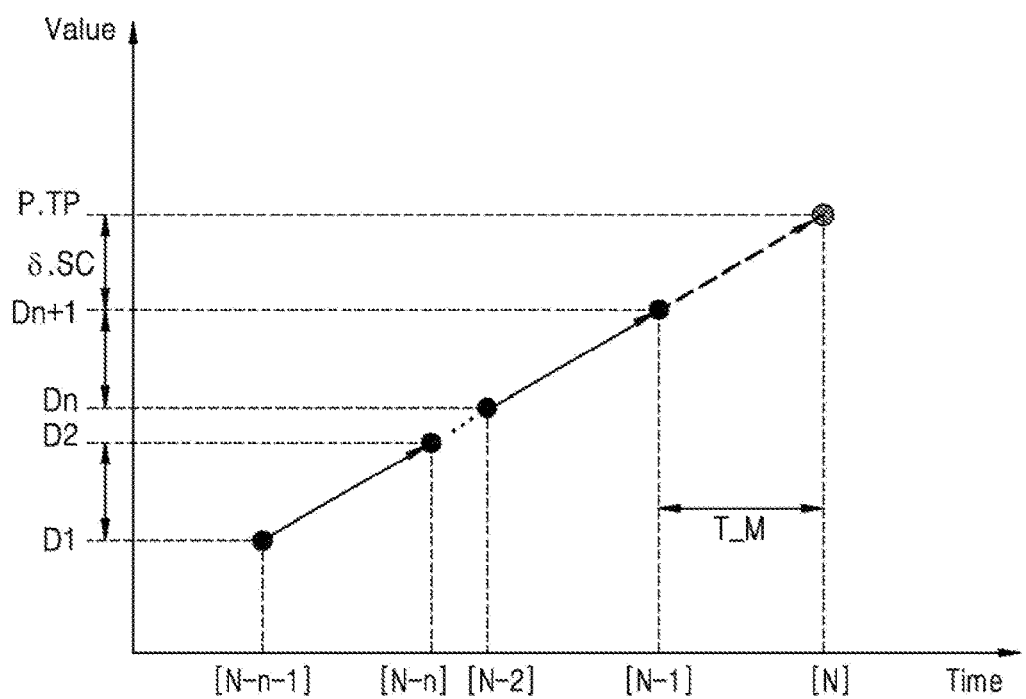

FIGS. 5A and 5B illustrate a method of determining a predicted parameter value P.TP at the measurement time [N] by using changes in a command parameter value S.cmdx.

In FIG. 5A, a first axis may denote the time of a manufacturing process of a semiconductor device, and a second axis may denote a command parameter value Value.cmd.

Here, the command parameter value Value.cmd may be signal information that controls a parameter value Value in FIG. 5B to have a desired value.

When the parameter value Value is a position value of a robot arm or similar, for example, a central processing unit (CPU) module may generate signal information at each of command times [G1], [G2], [Gx], and [Gx+1], wherein the signal information controls the robot arm or the like to move to each of the designated position values P.cmd1, P.cmd2, . . . , and P.cmdx, and may transmit the signal information to a digital signal processor (DSP) module.

The signal information may be a signal that moves the robot arm or the like by a change in a command parameter value δ.cmdx from a command time [Gx] to a command time [Gx+1]).

The signal information may be regularly generated and transmitted at constant time intervals T_C. In this regard, command times [G1], [G2], [Gx], and [Gx+1] may be set to have a constant time interval T_C therebetween.

Otherwise, the time interval T_C between the command times [Gx] and [Gx+1] may be different from the time interval T_M between the measurement times [N−1] and [N] in FIG. 5B. The time interval T_C between the command times [Gx] and [Gx+1] may be 1 ms, and the time interval T_M between the measurement times [N−1] and [N] may be 0.1 Ins, and a detailed description thereof will be provided later by referring to FIG. 5B.

FIG. 5B illustrates a predicted parameter value P.TP at the measurement time [N].

Referring to FIGS. 5A and 5B, the predicted parameter value P.TP according to the exemplary embodiment may be determined by using a change in the command parameter value δ.cmdx applied at the measurement time [N].

For example, when the measurement time [N] is between the command time [Gx] and the command time [Gx+1], the robot arm or the like may be controlled to move by the change in the command parameter value δ.cmdx at the measurement time [N], and thus the predicted parameter value P.TP may be determined using the change in the command parameter value δ.cmdx between the command time [Gx] and the command time [Gx+1].

A time interval T_C between the command times [Gx] and [Gx+1] may be different from a time interval T_M between the measurement times [N−1] and [N], and thus, scaling may be needed when determining the parameter value P.TP based on the change in the command parameter value δ.cmd.

For example, a scaled change in the parameter value δ.sc is needed to determine the predicted parameter value P.TP and the scaled change in the parameter value δ.sc and the change in the command parameter value δ.cmdx may be expressed in Equation 8.

$$\delta.sc = (T\_M/T\_C) * \delta.cmdx \quad \text{[Equation 8]}$$

For example, when the time interval T_C between the command times [Gx] and [Gx+1] is 1 ms, and the time interval T_M between the measurement times [N−1] and [N] is 0.1 ms, the scaled change in the parameter value δ.sc and the change in the command parameter value δ.cmdx may be expressed in Equation 9.

$$\delta.sc = 1/10 * \delta.cmdx \quad \text{[Equation 9]}$$

When the scaled change in the parameter value δ.sc is determined by Equation 8, the predicted parameter value P.TP at the measurement time [N] may be determined from Equation 10 based on the scaled change in the parameter value δ.sc.

$$P.TP = Dn+1 + \delta.sc \quad \text{[Equation 10]}$$

When the predicted parameter value P.TP at the measurement time [N] is determined using the change in the command parameter value δ.cmdx, the predicted parameter value P.TP may be determined in a more stable manner than the case when the predicted parameter value P.TP is determined based on the measured data (e.g., parameter values measured prior to the measurement time [N]). This is because the change in the command parameter value δ.cmdx does not include noise that may occur during the measurement and is included in the other measured data.

Figure 6A:
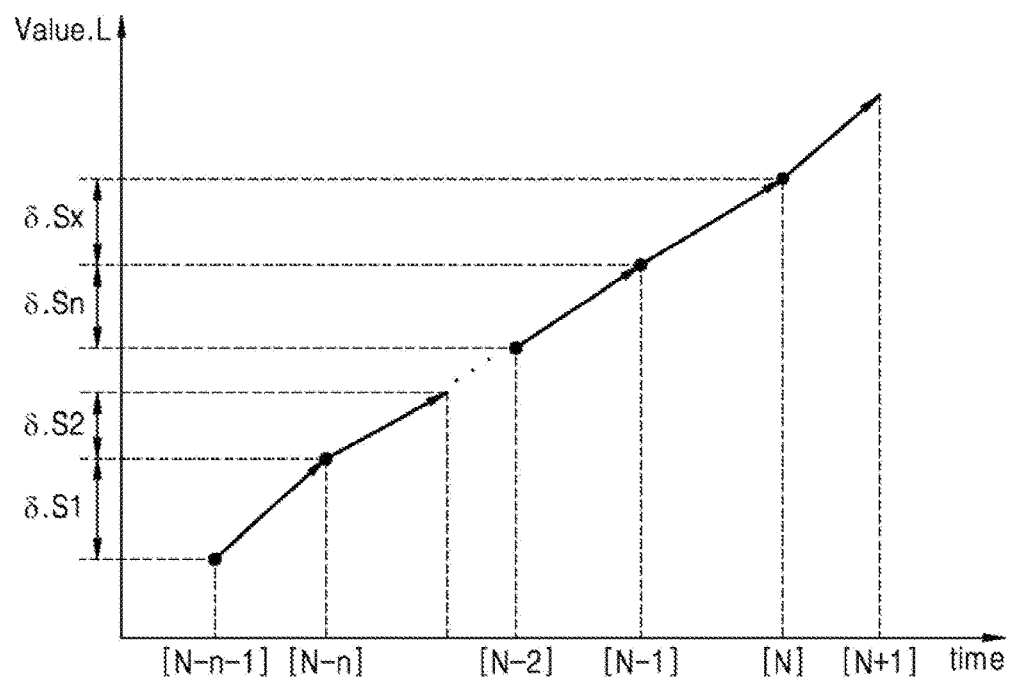
FIGS. 6A and 6B illustrate a method for determining a predicted parameter value P.L at the measurement time [N] using a learning parameter value Value.L.
Figure 6B:
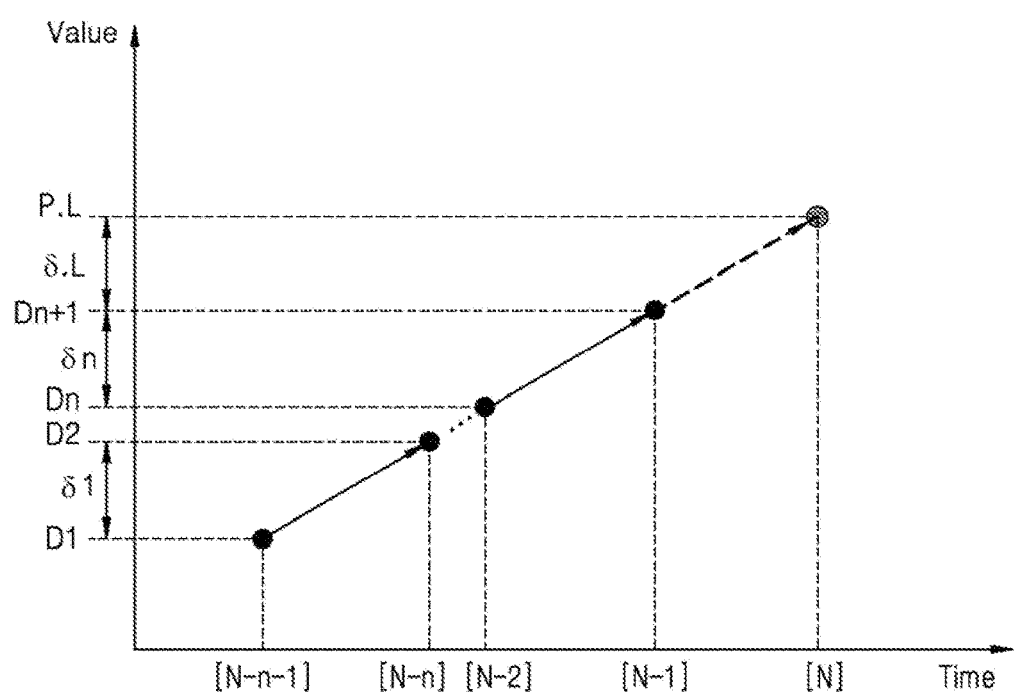

FIGS. 6A and 6B illustrate a method for determining a predicted parameter value P.L at the measurement time [N] using a learning parameter value Value.L.

In FIG. 6A, a first axis may denote the time of a manufacturing process of a semiconductor device, and a second axis may denote a learning parameter value Value.L.

In this case, the learning parameter value Value.L may refer a parameter value Value that is obtained from learning during the repeated process for manufacturing a semiconductor device and the parameter value Value may be stored in a database or the like.

The learning parameter value Value.L is illustrated in a graph such as the one in FIG. 6A, but is not limited thereto. For example, the learning parameter value Value.L may be bit data stored in a table.

The learning parameter value Value.L may be stored in a database or the like using various learning algorithms.

For example, the learning parameter value Value.L may be performed by the various learning algorithms such as a multiple linear regression algorithm, a multiple nonlinear regression algorithm, a neural network algorithm, a support vector regression algorithm, a k nearest neighbor (KNN) regression algorithm, a design of experiment (DOE) algorithm, a Hotelling's T square algorithm, a Gaussian density estimator algorithm, a principal component analysis (PCA) algorithm, a novelty detection algorithm, a score plot analysis algorithm, a partial least squares-discriminant analysis (PLS-DA) algorithm, a hierarchiral cluster analysis (HCA) algorithm, a partial least squares (PLS) regression algorithm, a support vector machine (SVM) algorithm, a fuzzy logic algorithm, a K-means clustering algorithm, a mixture of Gaussian (MoG) algorithm, a K-nearest neighbor (K-NN) algorithm, and/or a support vector data description (SVDD) algorithm.

Changes in the learning parameter values δ.S1, δ.S2, . . . , δ.Sn, and δ.Sx may refer changes in the learning parameter values Value.L at the measurement times [N−n−1], [N−n], [N−2], [N−1], [N], and [N+1].

FIG. 6B illustrates the predicted parameter value P.L at the measurement time [N].

Referring to FIGS. 6A and 6B, the predicted parameter value P.L according to the exemplary embodiment may be determined based on the learning parameter value Value.L stored in the database or the like (or the change in the learning parameter value δ.Sx).

For example, a change in the learning parameter value δ.Sx between the measurement time [N−1] and the measurement time [N] may be looked up from among the learning parameter values Value.L stored in the database to determine a change in a parameter value δ.L. For example, the change in the parameter value δ.L between the measurement time [N−1] and the measurement time [N] is determined based on the change in the learning parameter value δ.Sx between the measurement time [N−1] and the measurement time [N], as defined by the formula of Equation 11.

$$\delta.L = \delta.Sx \quad \text{[Equation 11]}$$

When the change in the parameter value δ.L is determined by Equation 11, the predicted parameter value P.L at the measurement time [N] may be determined based on the change in the parameter value δ.L as shown in Equation 12 below.

$$P.L = Dn+1 + \delta.L \quad \text{[Equation 12]}$$

When the predicted parameter value P.L is determined by using the learning parameter value Value.L, as in the exemplary embodiment, the predicted parameter value P.L may be determined in a highly stable manner. Since the learning parameter value Value.L is learned when the robot arm or the like repeatedly performs a certain operation, the learning parameter value Value.L may be less affected by noise that may occur from time to time when the certain operation is performed.

Various methods of determining the predicted parameter value P.L that may be applied to a method of processing measurement information according to an exemplary embodiment are described above in FIGS. 2 to 6B.

The method of processing the measurement information may include one or more methods of determining the predicted parameter value P.L from among the methods described above.

For example, the predicted parameter value P.L may be determined based on one or more temporary predicted parameter values obtained by one or more methods selected from the extrapolation method, the method of using the average of the changes in the parameter value, the method of using the weighted average of the changes in the parameter value, the method of using the change in the command parameter value, and the method of using the learning parameter value, described with reference to FIGS. 2 to 6B.

In some embodiments, the predicted parameter value P.L may be an average of the one or more temporary predicted parameter values. In some embodiments, the predicted parameter value P.L may be a weighted average of the one or more temporary predicted parameter values.

Figure 7:
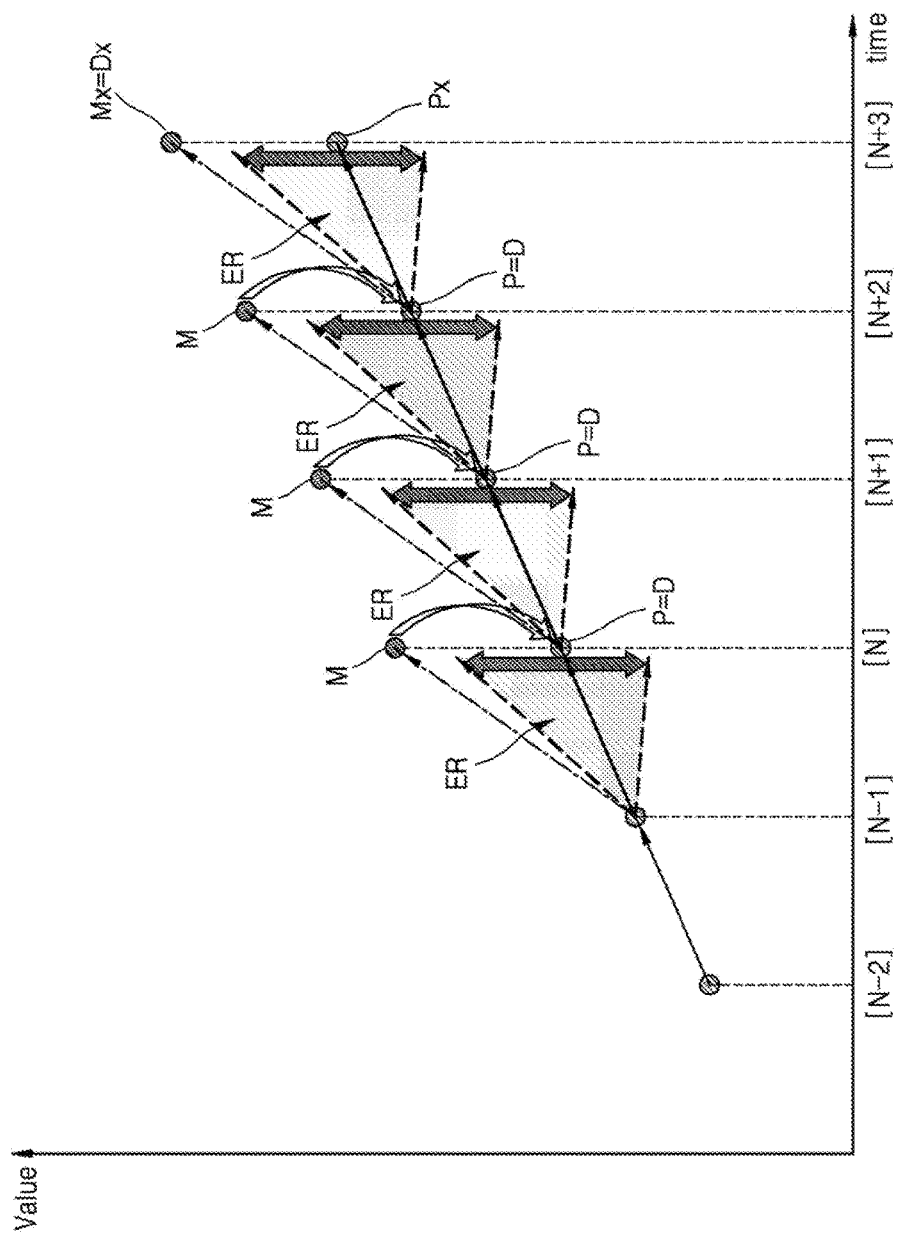
FIG. 7 illustrates how the methods for processing the measurement information described with reference to FIGS. 1A to 6B are applied to each of a plurality of measurement times [N−2], [N−1], [N], [N+1], [N+2], and [N+3]

FIG. 7 illustrates how the methods of processing the measurement information described with reference to FIGS. 1A to 6B are applied to each of a plurality of measurement times [N−2], [N−1], [N], [N+1], [N+2], and [N+3].

Referring to FIG. 7, measured parameter values M at measurement times [N], [N+1], and [N+2] are out of an error range ER, and thus the measured parameter values M are regarded as noise, thereby determining the predicted parameter value P as a determined parameter value D. For example, the parameter values are successively corrected three times.

In some embodiments, when corrections of the parameter value are successively performed more than a certain number of times based on whether the measured parameter values M are regarded as noise as described above, a measured parameter value Mx at a measurement time [N+3], which is the measurement time after the final correction of the parameter value is performed, may be set not to be determined as noise though the measured parameter value Mx is out of the error range ER at the measurement time [N+3]. In other words, at the measurement time [N+3], the measured parameter value Mx, that is, not the predicted parameter value Px, may be determined as the determined parameter value D.

In this case, the method of processing the measurement information using the predicted parameter value Px according to one or more exemplary embodiments may not be applied to measurement times [N+4], [N+5], . . . after the measurement time [N+3]. Since, when the measured parameter value Mx is determined to be the determined parameter value Dx at the measurement time [N+3] is considered noise before a correction is applied, a prediction of the parameter value may be performed based on the wrongly determined parameter value Dx at the measurement times [N+4], [N+5], . . . .

Otherwise, when the corrections of the parameter value are successively performed more than a certain number of times based on whether the measured parameter values M are regarded as noise, the method of processing measurement information (see FIGS. 5A and 5B) using the predicted parameter value P.TP determined by the change in the command parameter value δ.cmdx may be applied to the measurement times [N+4], [N+5], . . . after the measurement time [N+3].

The method of processing measurement information using the predicted parameter value P.TP is determined by the change in the command parameter value δ.cmdx, since the change in the command parameter value δ.cmdx and the predicted parameter value P.TP are determined regardless of whether or not the measured parameter value Mx is noise, the parameter value may be predicted in a stable manner at the measurement times [N+4], [N+5], . . . after the measurement time [N+3].

Figure 8:
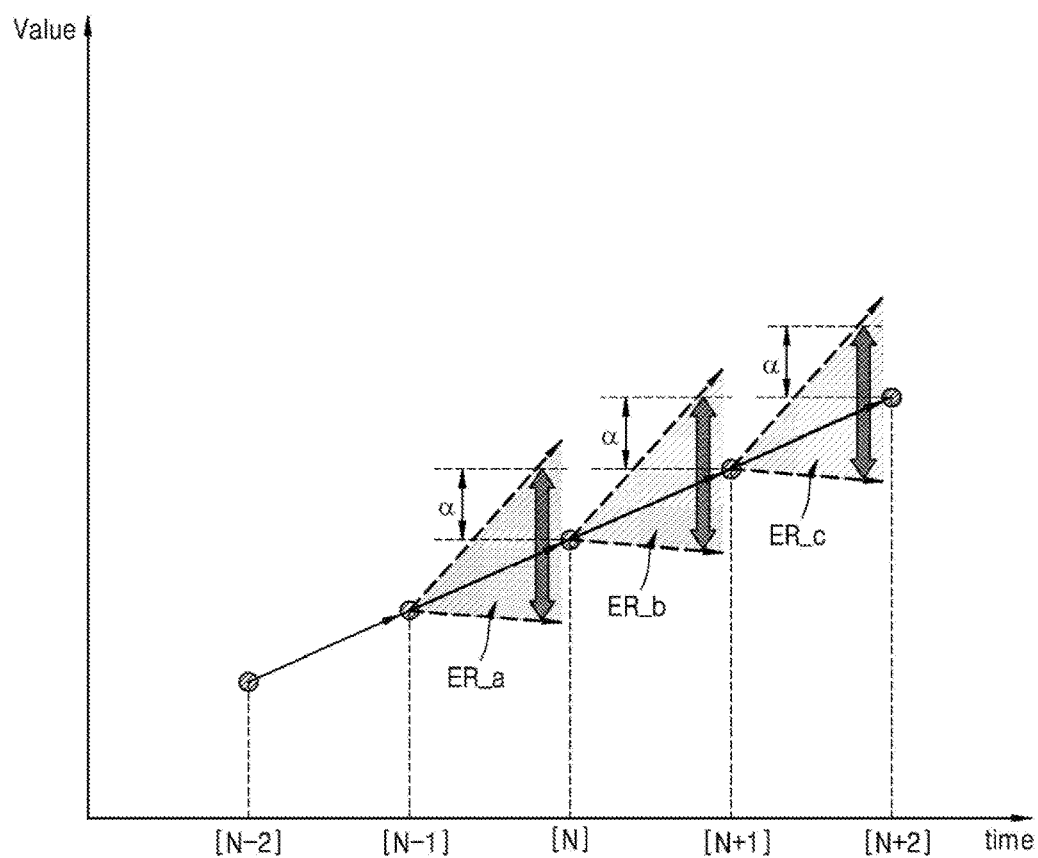
FIGS. 8 and 9 illustrate error ranges that may be applied to the methods for processing measurement information according to one or more exemplary embodiments.
Figure 9:
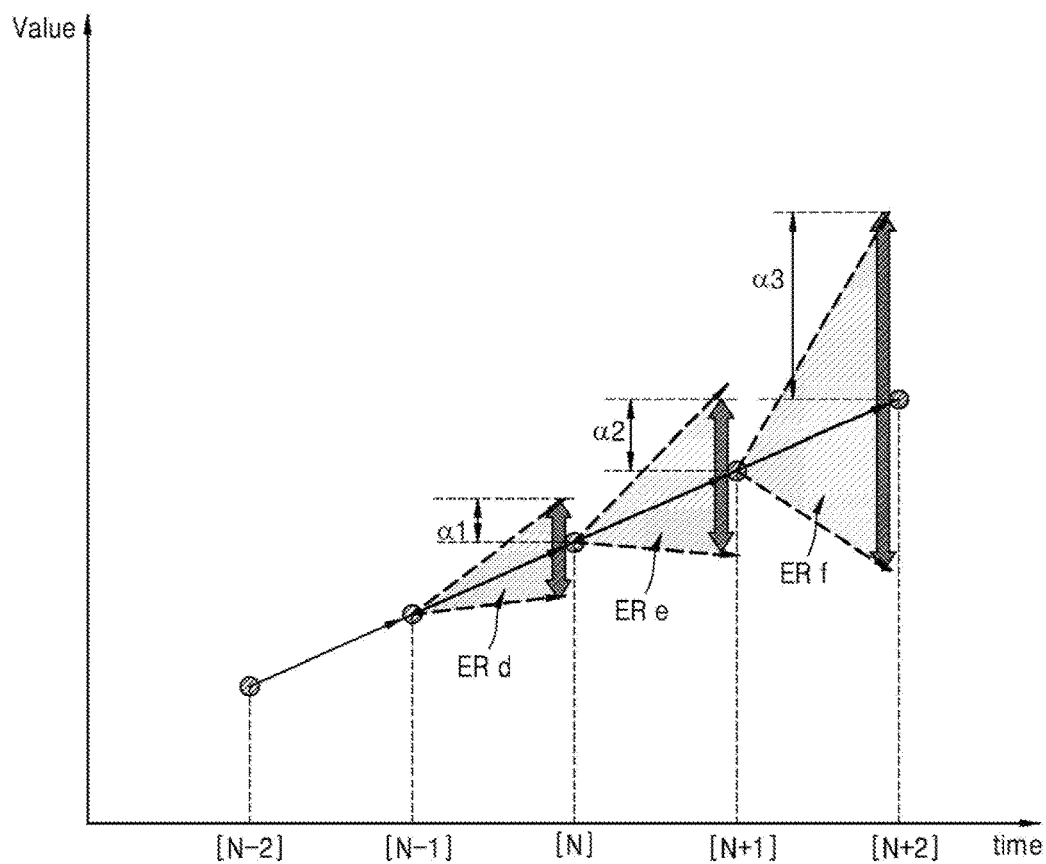

FIGS. 8 and 9 illustrate error ranges that may be applied to the methods of processing measurement information according to one or more exemplary embodiments.

Referring to FIG. 8, error ranges ER_a, ER_b, and ER_c respectively at the measurement times [N], [N+1], and [N+2] may have a constant width (±α).

When the error ranges ER_a, ER_b, and ER_c at the measurement times [N], [N+1], and [N+2] have a constant range, determining if the measured parameter value Mx is noise may be done in a consistent manner.

Referring to FIG. 9, error ranges ER_d, ER_e, and ER_f at respectively the measurement times [N], [N+1], and [N+2] may have different widths.

For example, the error range ER_d may have a width of ±α1, the error range ER_e may have a width of ±α2, which is wider than that of the error range ER_d, and the error range ER_f may have a width of ±α3, which is wider than that of the error range ER_e.

When the error ranges ER_d, ER_e, and ER_f respectively at the measurement times [N], [N+1], and [N+2] have different widths, the possibility of wrongly determined parameter values may be reduced, and thus the torque flick phenomenon caused by a decision error on noise, which may occur when the wrongly determined parameter vales are accumulated may also be reduced.

What is claimed is:

1. A method of processing location information of a manufacturing equipment used to manufacture a semiconductor device, the method comprising:
   predicting a first location value comprising a predicted location value where the manufacturing equipment will be located at a first measurement time;
   determining an error range based on the predicted location value of the manufacturing equipment;
   measuring a second location value comprising a measured location value where the manufacturing equipment is located at the first measurement time; and
   determining a third location value comprising a determined location value at the first measurement time based on the predicted location value, the measured location value, and the error range,
   wherein the predicted location value where the manufacturing equipment will be located at the first measurement time is obtained using a change in the predicted location value where the manufacturing equipment will be located at a second measurement time prior to performing the measuring at the first measurement time by extrapolating from a previously predicted location value.

2. The method of claim 1, wherein the determined location value is obtained by:
   when the measured location value is out of the error range, the measured location value is identified as noise and the predicted location value is selected as the determined location value; and
   when the measured location value is within the error range, the measured location value is selected as the determined location value.

3. The method of claim 1, wherein the predicted location value where the manufacturing equipment will be located at the first measurement time is obtained by using an average of changes in the predicted location value that occur at each of a plurality of successive measurement times immediately prior to performing the measuring at the first measurement time.

4. The method of claim 1, wherein the predicted location value where the manufacturing equipment will be located at the first measurement time is obtained by using a weighted average of changes in the predicted location value that occur at each of a plurality of successive measurement times immediately prior to performing the measuring at the first measurement time.

5. The method of claim 1, wherein the predicted location value where the manufacturing equipment will be located at the first measurement time is obtained by scaling the predicted location value commanded at a command time of a second measurement time immediately prior to performing the measuring at the first measurement time.

6. The method of claim 1, wherein the predicted location value where the manufacturing equipment will be located at the first measurement time is obtained by scaling the predicted location value commanded at a command time that is selected from a plurality of measurement times prior to performing the measuring at the first measurement time.

7. The method of claim 1, wherein the predicted location value where the manufacturing equipment will be located at the first measurement time is obtained by using a change in the predicted location value between the first measurement time and a second measurement time immediately prior to performing the measuring at the first measurement time, wherein the second measurement time is learned by repeatedly performing certain operations and is stored in a database.

8. A method of processing measurement information of a semiconductor device by a manufacturing equipment used to manufacture the semiconductor device, the method comprising:
   predicting a first parameter value comprising a predicted parameter value of the manufacturing equipment at a first measurement time;
   determining an error range of the manufacturing equipment based on the predicted parameter value;
   measuring a second parameter value con rising a measured parameter value at the first measurement time; and
   determining a third parameter value comprising a determined parameter value based on the predicted parameter value, the measured parameter value, and the error range,
   wherein the measured parameter value is a measurement value measured in the manufacturing equipment used for manufacturing a semiconductor device, and
   wherein the manufacturing equipment includes a robotic arm, and the method further includes accepting the measured parameter value as a determined parameter value when the measured parameter value falls within the error range, or rejecting the measured parameter value if the measured parameter value falls outside the error range, and
   controlling a movement of the robotic arm based on a command parameter value, wherein the predicted parameter value is based on a change in the command parameter value applied at a measurement time N.

9. The method of claim 8, wherein the measured parameter value is a measurement value measured in the semiconductor device by the manufacturing equipment when manufacturing the semiconductor device.

10. The method of claim 8, wherein the measured parameter value is one selected from location, temperature, impedance, admittance, current, voltage, thickness of the semiconductor device and thickness of the manufacturing equipment.

11. The method of claim 8, wherein in the determining of the determined parameter value, when the measured parameter value is within the error range, the measured parameter value is determined to be the determined parameter value at the first measurement time.

12. The method of claim 8, wherein in the determining of the determined parameter value, when the measured parameter value is out of the error range, the predicted parameter value is determined to be the determined parameter value at the first measurement time.

13. A method for processing measurement information of a semiconductor device during manufacture by a manufacturing equipment used to manufacture the semiconductor device, the method comprising:
   predicting a first parameter value comprising a predicted parameter value of the semiconductor device at least at a first measurement time;
   determining an error range, wherein the error range has a top which is greater than the predicted parameter value and a bottom which is less than the predicted parameter value;

measuring a second parameter value comprising a measured parameter value of the semiconductor device at a second measurement time, wherein the second measurement time occurs after the first measurement time;

accepting the measured parameter value as a determined parameter value when the measured parameter value falls within the error range, or rejecting the measured parameter value if the measured parameter value falls outside the error range, and wherein the manufacturing equipment includes a robotic arm, and the method further includes controlling a movement of the robotic arm based on a command parameter value, wherein the predicted parameter value is based on a change in the command parameter value applied at a measurement time N.

14. The method of claim 13, wherein determining the error range includes taking into account a physical limit of a change of an object between the first measurement time and the second measurement time, wherein the physical limit includes a moving speed, a maximum range of acceleration or deceleration of an object.

* * * * *